United States Patent
Kuisma et al.

(10) Patent No.: US 7,302,857 B2
(45) Date of Patent: Dec. 4, 2007

(54) METHOD FOR REDUCING THE TEMPERATURE DEPENDENCE OF A CAPACITIVE SENSOR AND A CAPACITIVE SENSOR CONSTRUCTION

(75) Inventors: Heikki Kuisma, Helsinki (FI); Juha Lahdenperä, Espoo (FI); Risto Mutikainen, Espoo (FI)

(73) Assignee: VTI Technologies Oy, Vantaa (FI)

( * ) Notice: Subject to any disclaimer, the term of this patent is extended or adjusted under 35 U.S.C. 154(b) by 0 days.

(21) Appl. No.: 10/503,089

(22) PCT Filed: Feb. 10, 2003

(86) PCT No.: PCT/FI03/00101

§ 371 (c)(1),
(2), (4) Date: Sep. 29, 2004

(87) PCT Pub. No.: WO03/069295

PCT Pub. Date: Aug. 21, 2003

(65) Prior Publication Data

US 2005/0105245 A1    May 19, 2005

(30) Foreign Application Priority Data

Feb. 13, 2002    (FI) .................... 20020292

(51) Int. Cl.
G01B 7/16    (2006.01)
G01L 1/00    (2006.01)

(52) U.S. Cl. ........................................ 73/780

(58) Field of Classification Search ............... 73/31.05, 73/780
See application file for complete search history.

(56) References Cited

U.S. PATENT DOCUMENTS

| 4,084,190 | A | * | 4/1978 | Stein ..................... 348/302 |
| 4,203,128 | A | * | 5/1980 | Guckel et al. ............. 331/156 |
| 4,823,230 | A | * | 4/1989 | Tiemann ................. 361/283.1 |
| 4,926,051 | A | * | 5/1990 | Turnbull ................... 250/332 |
| 5,100,478 | A | * | 3/1992 | Kawabata ................. 136/249 |
| 5,334,867 | A | * | 8/1994 | Shin et al. ................ 257/222 |
| 5,451,541 | A | * | 9/1995 | Sugiyama ................. 438/404 |
| 5,600,072 | A |   | 2/1997 | Chen et al. |
| 5,936,164 | A |   | 8/1999 | Sparks et al. |
| 6,555,870 | B1 | * | 4/2003 | Kirisawa ................. 257/324 |
| 6,651,506 | B2 | * | 11/2003 | Lee et al. ................. 73/718 |
| 6,842,965 | B2 | * | 1/2005 | Otobe et al. .............. 29/595 |
| 6,860,154 | B2 | * | 3/2005 | Yamamoto et al. ......... 73/718 |

FOREIGN PATENT DOCUMENTS

| DE | 41 36 995 A1 | 5/1993 |
| DE | 196 40 960 A1 | 4/1998 |
| WO | WO-00/2028 A1 | 1/2000 |

* cited by examiner

*Primary Examiner*—Michael Cygan
*Assistant Examiner*—Octavia Davis
(74) *Attorney, Agent, or Firm*—Birch, Stewart, Kolasch & Birch, LLP

(57) ABSTRACT

A method of manufacturing a sensor including forming an insulating layer on top of a conductive substrate, and forming a conducting electrode on top of the insulating layer. Further, the insulating layer is formed to include support areas formed at edges of the conducting electrode and a partial area formed under the conducting electrode, and a thickness (d2) of the partial area of the insulating layer is less than a thickness (d1) of the support areas of the insulating area.

11 Claims, 2 Drawing Sheets

METHOD FOR REDUCING THE TEMPERATURE DEPENDENCE OF A CAPACITIVE SENSOR AND A CAPACITIVE SENSOR CONSTRUCTION

BACKGROUND OF THE INVENTION

1. Field of the Invention

The present invention relates to a method for reducing the temperature dependence of a capacitive sensor.

The invention also relates to a capacitive sensor construction.

2. Discussion of the Background Art

Capacitive sensors are used in the measurement of, for instance, acceleration, angular acceleration, angular velocity, and pressure.

According to the state of the art, in capacitive sensors, an insulating layer is used to connect the mechanical construction from the support areas of the sensor and to create a capacitor construction. The support area can act as a mechanical support, an electrical insulation, and as part of a gas-tight chamber. The support area is often located at the edges of the sensor.

The insulation can be a unified glass disc, on the inside of which a electrode is formed by means of, for example, thin-membrane metallizing.

A construction of this kind causes a large state of stress in the silicon disc contained in the moving mechanical component, due to the difference in the thermal expansion coefficients of the materials. This, in turn, causes structural deformations as the temperature changes and consequently a temperature dependence in the electrical properties.

The insulating layer can be manufactured on top of the silicon layer by joining a silicon disc to a glass disc, or, for example, by melting glass onto the surface of the silicon. The silicon under the glass surface reduces the structural deformations and stresses and also permits the silicon structure forming the support to be used as an electrical terminal.

The invention is intended to create an entirely new type of method and sensor construction, by means of which the drawbacks of the state of the art described above can be eliminated.

The invention is based on forming the insulating layer to be thinner, at least in the active areas of the sensor, than in the support areas of the sensor. The term active areas of the sensor refers to the areas affecting the changing capacitance of the sensor. Typically, this insulating area is of glass, silicon oxide, or some other insulating material generally used in microelectronics.

Considerable advantages are gained with the aid of the invention.

In a capacitive sensor, it is possible to combine the requirements of a small parasitic capacitance and a small deformation (deflection) of the disc. The thermal coefficient of the capacitance can thus be made small over a specific temperature range.

BRIEF DESCRIPTION OF THE DRAWING

In the following, the invention is examined with the aid of examples and with reference to the accompanying drawings.

DESCRIPTION OF THE PREFERRED EMBODIMENT

Figure 1:
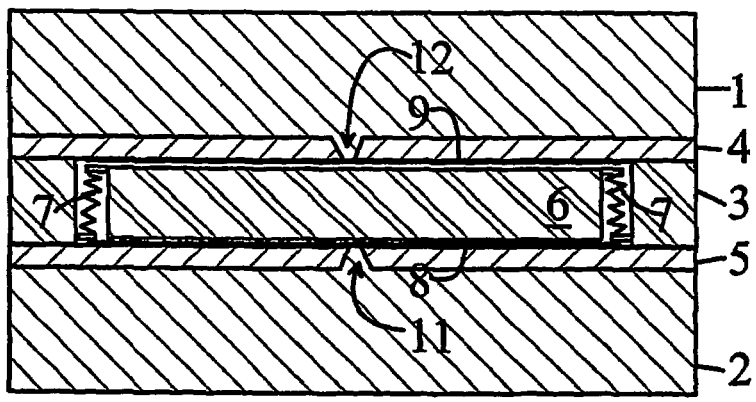
FIG. 1 shows a side view of a cross section of one sensor construction according to the state of the art.

FIG. 1 is examined according to the co-ordinates of the figure (upper/lower part). In a normal situation, the sensor can naturally be in any position at all in its operating environment. In terms of manufacturing technique, the set of co-ordinates of the figure can correspond to the real manufacturing set of co-ordinates, or be rotated through 180°.

The construction of FIG. 1 is built on top of a thick silicon layer 2 that acts as a substrate. The silicon layer 2 is typically electrically conductive. On top of the silicon layer 2, a glass layer 5 is formed, which acts as an insulation. Feed-through protrusions 11 are arranged through the glass layer 5. The feed-through protrusions 11 are intended to create an electrical contact with the electrode structure 8, which is formed on top of the glass layer 5. On top of the glass layer 5 is a conducting silicon layer 3, on which a moving sensor construction 6 is formed, using, for example, silicon micromechanical means, as well as flexible attachments 7 that act as a supporting structure for this. In the solution of FIG. 1, the moving sensor construction 6 is made massive, while the attachment structures 7 are made as flexible as possible, because the construction in question is an acceleration sensor. On top of the silicon layer 3, a construction is placed that is a mirror image of the layers 2 and 5, in which the upper electrode 9 is beneath a second glass layer 4 and above the glass layer there is, in turn, a second silicon layer 1. As in the lower structure, the electrode 9 is connected electrically to the silicon layer 1, with the aid of feed-through protrusions 12. The electrode structures 8 and 9 are formed in the area of the moving sensor construction 6, which is in practice slightly larger than the vertical projection of the moving electrode 6. The electrode can also be delimited with the aid of, for example, an annular protecting electrode. Electrotechnically, the conducting moving sensor construction 6 forms a pair of capacitors, for measuring acceleration. The first capacitor is formed between the under surface of the moving sensor construction 6 and the electrode 8, while correspondingly the second capacitor is formed between the upper surface of the moving sensor construction 6 and the electrode 9. The following gives typical dimensions of the construction.

Thickness of the silicon layers 1 and 2: 0.3 mm . . . 1.2 mm

Thickness of the silicon layer 3: 0.2 mm . . . 0.6 mm

Thickness of the glass layers 4 and 5: 5 µm . . . 150 µm

Mass of the moving electrode 6: 0.1 milligrams . . . 10 milligrams

Figure 2:
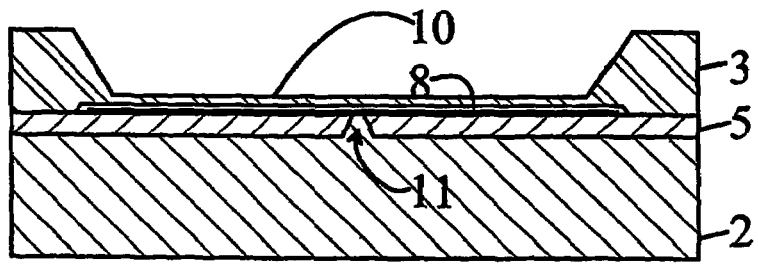
FIG. 2 shows a side view of a cross section of a second sensor construction according to the state of the art.

Surface area of the vertical projection of the moving electrode 6: 0.01 mm$^2$ . . . 10 mm$^2$ Surfaces area of the electrodes 8 and 9: 0.01 mm$^2$ . . . 10 mm$^2$ Distance between the electrode 6 and the electrodes 8 and 9, at rest: 0.1 µm . . . 10 µm FIG. 2 shows an absolute pressure sensor construction, in which the layers 2 and 5 correspond to the corresponding layers of FIG. 1. The silicon layer 3, on the other hand, is etched in such a way that a unified sensor membrane 10 is formed on it, the deflection of which is proportional to the external pressure. The deflection of the membrane 10 causes, in turn, capacitance changes in the capacitor, which is formed by the membrane 10 and the electrode 8. A vacuum or a desired reference pressure is arranged in the closed space remaining between the membrane 10 and the electrode 8.

Figure 3:
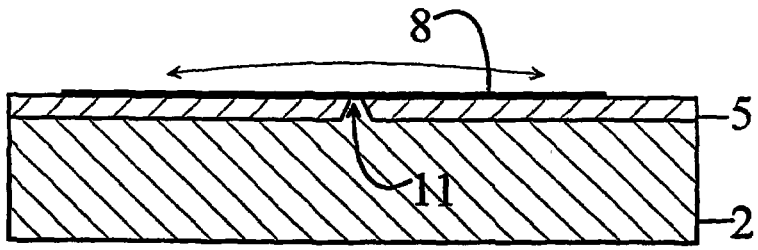
FIG. 3 shows a side view of cross sections of the solutions according to FIGS. 1 and 2.

FIG. 3 illustrates the problem of the solutions according to FIGS. 1 and 2, the curing that is caused by the thermic incompatibility of the two materials. The construction thus acts as a 'bimetallic plate'.

Figure 4:
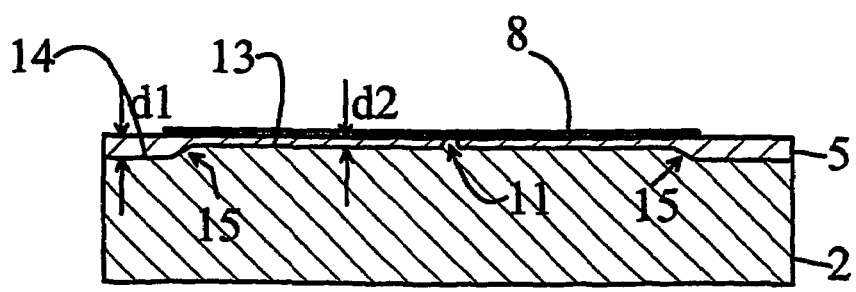
FIG. 4 shows a side view of a cross section of the sensor component according to the invention.

FIG. 4 shows the basic construction according to the invention, in which the insulating layer 5 is shaped to minimize thermic incompatibility. In the insulating glass layer 5 formed on the surface of the silicon disc that is part of the capacitive sensor construction, there are glass areas of different thickness, typically two different thicknesses, so that in the support areas 16, shown in FIGS. 5 and 6 and located in the thick area 14 of glass, there is thicker glass than in the active area 13. The glass layer 5 can also, in some areas of the disc, extend vertically through the entire disc, in which case in the silicon forming the support, areas, which are electrically insulated from each other, are formed. The construction according to the invention can be applied, for example, in capacitive acceleration sensor constructions (thick silicon-glass symmetrically on both sides of the thinner silicon) (FIG. 5), or in a pressure sensor construction (thick silicon-glass-thin silicon) (FIG. 6).

According to the invention, there is a thicker glass insulation layer 14 in the support areas (generally at the edges of the sensor) that influence the parasitic capacitance of the capacitive sensor. By this means, a lower parasitic capacitance is achieved parallel to the sensor's varying capacitance.

The glass 5 in the central part of the sensor causes a temperature dependent deflection in the glass-silicon construction (the 'bimetallic plate'). The thermal expansion coefficient of the borosilicate glass is generally slightly greater than that of silicon, so that the curvature of the glass surface under the capacitance electrode 8 changes in a convex direction as the temperature increases. This leads to an increase in capacitance as the temperature increases, i.e. a positive temperature dependence of the capacitance. If the glass is quartz ($SiO_2$), the thermal expansion coefficient of which is lower than that of silicon, the deflection causes a negative temperature dependence of the capacitance (Phenomenon 1).

The different thickness d1 and d2 of the glass layers at the location of the electrode of the capacitor that support the frame at the edges of the sensor construction and in the centre of it follow the movement of the surface of the electrode on the surface of the glass to a different level in relation to the glass surface at the frame component. If the thermal expansion coefficient of the glass is greater than that of silicon, the thicker glass 14 at the edge will then cause a small negative temperature dependence in the capacitance. If the thermal coefficient of the glass is lower than that of silicon, the phenomenon will cause a small positive temperature dependence in the capacitance (Phenomenon 2).

The thicknesses d1 and d2 of the glass can be selected in such a way that the Phenomena 1 and 2 cancel each other precisely at a specific temperature. Generally, the temperature coefficient of the capacitance cannot be zeroed at all temperatures. Phenomenon 1 depends on the thermal expansion coefficients and elastic modulus of the materials, Phenomenon 2 depends on the thermal expansion coefficients. The material parameters generally depend on the temperature in a different way. The thermal expansion coefficient of glass is constant while the thermal expansion of silicon increases as a function of temperature within the normal operating range, e.g. $-40°$ C. ... $+125°$ C. The thickness d1 of the glass at the edges can be used to adjust the parasitic capacitance of the capacitive sensor. By adjusting the ratio d2/d1 of the thicknesses of the glass, it is possible to make the temperature dependence of the sensor construction optimally small. Suitable values for the thicknesses can be defined numerically.

The following is an analysis of the effect of temperature on the sensor (FIG. 4). First of all, the changes in the thickness of the d1—thickness surface layer, in different areas during a temperature change of magnitude)T (curvature not taken into account)

$$\Delta 1 = d1 * \alpha 1 * \Delta T \tag{1}$$

$$\Delta 2 = d2 * \alpha 1 * \Delta T + (d1-d2) * \alpha Si * \Delta T \tag{2}$$

$$\Delta 2 - \Delta 1 = (d1-d2) * (\alpha g1 - \alpha Si) * \Delta T \tag{3},$$

in which, d1=thickness of the thicker glass 14 in the support area 16, d2=the thickness of the thinner glass 13 in the active area, $\Delta 1$=the change in the thickness of the thicker glass 14, $\Delta 2$=the change in the thickness of the correspondingly thick (d1) surface layer in the area 13 of the thinner glass, $\Delta g1$=the thermal expansion coefficient of glass, $\Delta Si$=the thermal expansion coefficient of silicon, and $\Delta T$=the change in temperature.

Thus, $\Delta 2-\Delta 1$ is the change in the surface levels between the thin glass area 13 and the thick glass area 14 following a change in temperature, if the curvature of the underlying silicon layer (of even thickness and rigid) is not taken into account.

In the basic solution of FIG. 4, the thin insulating layer 13 is located essentially beneath the electrode 8 and the thicker layer 14 in the edge areas of the sensor. The ratio d2/d1 of the thicknesses of the thin layer 13 and the thick layer 14 is typically 0.05-0.8, preferably about 0.5. The thin layer 13 and the thick layer 14 join each other in a transition zone 15. An endeavour is made to locate the transition zone sufficiently far from the support frame and the active electrode, if necessary, under the protection electrode, for example.

Figure 5:
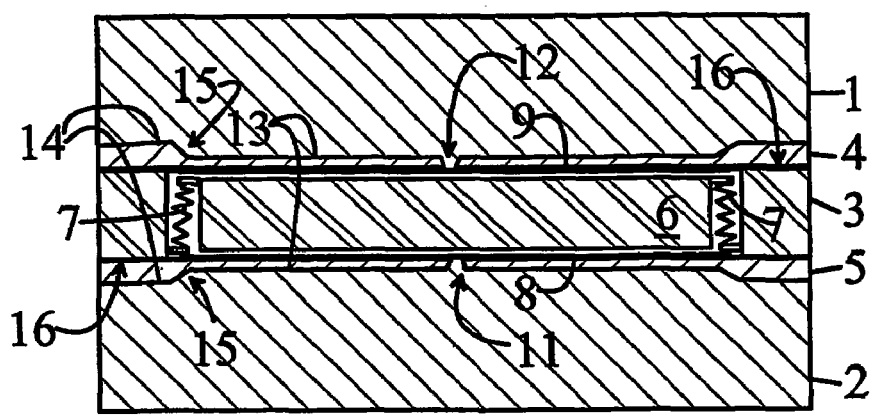
FIG. 5 shows a side view of a cross section of an acceleration sensor according to the invention.
Figure 6:
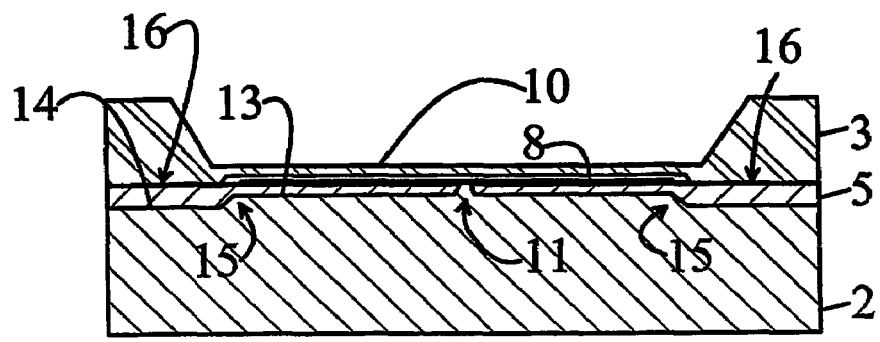
FIG. 6 shows a side view of a cross section of a pressure sensor according to the invention.

FIG. 5 shows an acceleration sensor construction according to the invention, in which there is an insulating structure 5 according to FIG. 4. Otherwise, the solution of FIG. 5 corresponds to the known sensor construction of FIG. 1. FIGS. 5 and 6 also show support areas 16, which are areas defined by the boundary surfaces of the glass and the silicon frame. FIG. 6, for its part, shows the same insulating structure solution 5, in connection with a pressure sensor. The solution of FIG. 6, on the other hand, corresponds in other ways to the known solution of FIG. 2.

Some other suitable conductor can be used in place of silicon.

The areas of thicker glass and the parts of the frame connected to them, or the mechanical supports can also be within the electrode structure in the central area of the sensor construction. In that case, there will naturally be less curvature in the plate structure.

The essential characteristic of the invention is thus the fact that the insulating layer is formed from at least two layers 13 and 14 of different thickness, in order to minimize the effect of temperature on the measurement results of the quantity being measured. When using typical materials, the thinner area is in the area of the electrode, but the aforementioned thin area can extend beyond the electrode area, or correspondingly the thin insulating area can even be somewhat smaller than the electrode area.

The invention claimed is:

1. A method of manufacturing a capacitive sensor, comprising:

forming an insulating layer on top of a conductive substrate; and forming a first conducting electrode on top of the insulating layer, wherein the insulating layer is formed to include support areas formed at edges of the first conducting electrode and a partial area formed under the first conducting electrode, wherein said support areas of the insulating layer are formed to support a second conducting electrode located a predetermined distance from the first conducting electrode and a forming capacitance element, wherein a thickness (d2) of the partial area of the insulating layer is less than a thickness (d1) of the support areas of the insulating layer, and wherein a top surface of the conductive substrate includes feed-through protrusion formed at areas corresponding to the thickness (d1) of the support areas of the insulating layer such that a top surface of the insulating layer is planar.

2. The method of claim 1, wherein a ratio of the thicknesses (d2)/(d1) of the insulating layer is between 0.05 and 0.8.

3. The method of claim 2, wherein the ratio of the thicknesses (d2)/(d1) of the insulating layer is substantially 0.5.

4. The method of claim 1, wherein the conductive substrate comprises an electrically conductive silicon substrate.

5. The method of claim 1, wherein the insulating layer comprises an insulating glass layer.

6. A capacitive sensor construction, comprising:

an insulating layer on top of a conductive substrate;

a first conducting electrode on top of the insulating layer; and a second conducting electrode located a predetermined distance from the first conducting electrode and forming a capacitance element, wherein the insulating layer includes support areas at edges of the first conducting electrode and a partial area under the first conducting electrode, said support areas of the insulating layer supporting said second conducting electrode.

wherein a thickness (d2) of the partial area of the insulating layer is less than a thickness (d1) of the support areas of the insulating layer, and wherein a top surface of the conductive substrate includes feed-through protrusions formed at areas corresponding to the thickness (d1) of the support areas of the insulating layer such that a top surface of the insulating layer is planar.

7. The capacitive sensor construction of claim 6, wherein a ratio of the thicknesses (d2)/(d1) of the insulating layer is between 0.05 and 0.8.

8. The capacitive sensor of construction claim 7, wherein the ratio of the thicknesses (d2)/(d1) of the insulating layer is substantially 0.5.

9. The capacitive sensor of construction claim 6, wherein the conductive substrate comprises an electrically conductive silicon substrate.

10. The capacitive sensor of construction claim 6, wherein the insulating layer comprises an insulating glass layer.

11. The capacitive sensor of construction claim 6, further comprising:

a feed-through protrusion through the insulating layer to create an electrical contact between the first conducting electrode and the conductive substrate when the sensor is activated.

* * * * *